United States Patent [19]

Timar

[11] Patent Number: 5,779,196
[45] Date of Patent: Jul. 14, 1998

[54] RAM AIR DRIVE LAMINAR FLOW CONTROL SYSTEM

[75] Inventor: Thomas Timar, Seattle, Wash.

[73] Assignee: The Boeing Company, Seattle, Wash.

[21] Appl. No.: 569,907

[22] Filed: Dec. 8, 1995

[51] Int. Cl.[6] .................................................. B64C 21/06
[52] U.S. Cl. ........................................ 244/209; 244/130
[58] Field of Search .................................. 244/204, 209, 244/53 B, 130

[56] References Cited

U.S. PATENT DOCUMENTS

| Re. 23,105 | 4/1949 | Stalker . | |
|---|---|---|---|
| 1,691,942 | 11/1928 | Stalker . | |
| 1,829,616 | 10/1931 | Stalker . | |
| 1,993,419 | 3/1935 | Stalker . | |
| 2,041,790 | 5/1936 | Stalker . | |
| 2,223,744 | 12/1940 | Stalker . | |
| 2,416,991 | 3/1947 | Griffith | 244/209 |
| 3,058,695 | 10/1962 | Simonis . | |
| 3,801,048 | 4/1974 | Riccius | 244/209 X |
| 3,981,466 | 9/1976 | Shah | 244/53 B X |
| 4,463,772 | 8/1984 | Ball | 244/53 B X |
| 4,477,040 | 10/1984 | Karanik . | |
| 5,114,103 | 5/1992 | Coffinberry | 244/209 |
| 5,143,329 | 9/1992 | Coffinberry | 244/209 |
| 5,236,155 | 8/1993 | Hrach | 244/209 X |
| 5,348,256 | 9/1994 | Parikh | 244/209 X |
| 5,447,283 | 9/1995 | Tindell | 244/53 B X |
| 5,535,967 | 7/1996 | Beauchamp et al. | 244/209 |

FOREIGN PATENT DOCUMENTS 2242235  9/1991  United Kingdom ................. 244/209

OTHER PUBLICATIONS

*Aviation Week & Space Technology* "F–16XL Laminar Testing", pp. 42–44.

*Primary Examiner*—William Grant
*Attorney, Agent, or Firm*—Christensen O'Connor Johnson & Kindness PLLC

[57] ABSTRACT

An improvement to supersonic laminar flow control suction systems, including an inlet air duct (32) for providing subsonic ram engine inlet air, is provided. The inlet air duct (32) supplies air pressure power to one or more turbines of suction system compressor units alone for flight conditions at or above a particular minimum speed and minimum altitude, and in conjunction with engine compressor bleed air for flight conditions below the minimum speed and minimum altitude. The inlet air duct (32) is angled in the direction of subsonic airflow approximately 30 degrees from the horizontal off an opening in an upper wall of a subsonic diffuser of an engine inlet on a supersonic aircraft, and is connected to a power input line that feeds one or more compressor unit turbines. A check valve prevents backflow of air toward the engine inlet. The suction system further includes a short compressor output duct (38) and a short turbine output duct (40). These two ducts join to form a single exhaust passage (42), ensuring a moderate overall suction air exhaust gas temperature.

16 Claims, 3 Drawing Sheets

RAM AIR DRIVE LAMINAR FLOW CONTROL SYSTEM

FIELD OF THE INVENTION

The present invention relates to aircraft boundary layer control systems and, more specifically, to methods and apparatus for providing additional power to supersonic aircraft laminar flow control suction systems.

BACKGROUND OF THE INVENTION

The major aerodynamic objectives of boundary layer control systems used on many aircraft include reducing drag, maximizing lift, and minimizing unsteady air flow. Several methods have been developed to meet these objectives. One system, suitable for use on both supersonic and subsonic aircraft, includes air suction holes located along portions of aerodynamic surfaces of the aircraft. The holes are usually located at the leading edge region of the wings of the aircraft, ahead of the front spar. Decelerated fluid particles from the boundary layer are sucked into the holes before the particles have a chance to interrupt the boundary layer flow by causing turbulence or flow separation. Drawing external air through an aerodynamic surface brings the boundary layer closer to the aircraft, which improves attachment of the airflow to the surface. Depending on the precise application, the use of air suction can result in an increase in lift, an increase in the stability of the boundary layer, a decrease in drag, and/or an increase in an aerodynamic surface's lift-to-drag ratio.

In addition to the perforated suction surface created by the holes, typical air suction systems include a turbine-driven compressor, internal ducts connecting the compressor with the suction surface, and internal passages connecting the compressor and turbine with a discharge nozzle. External air is drawn through the holes in the suction surface into the connecting ducts by the suction action of the compressor as it is turned by the turbine.

The compressor is necessary because the pressure of the ambient air at the suction surfaces is lower than the pressure of the ambient air at the discharge location. The compressor therefore provides suction action to draw air into the connecting ducts as well as compress the suction air to a pressure greater than ambient air pressure at the discharge location. Compression also compensates for pressure losses experienced by the suction air as it flows through the perforated suction surface skin and the various ducting. The compressor is typically located inside the airplane wing and is driven by a turbine that draws engine ram bleed air from the engine compressors.

After the compressor compresses the suction air, the pressurized air is discharged. The conventional method of discharging suction air is via a discharge nozzle. In supersonic aircraft, the discharge nozzle is usually placed at the trailing edge of the wing, near the fuselage, facing aft.

Use of current compressors has a number of disadvantages. A first disadvantage is a potentially large turbine power requirement. More specifically, when suction air is discharged through the discharge nozzle at a velocity lower than the airplane velocity, a suction air discharge momentum drag is incurred at the point of discharge. From the standpoint of minimizing this momentum drag, it is advantageous to release the suction air from the discharge nozzle at a velocity approaching the free-stream velocity of the airplane. This requires compressing the suction air to a larger pressure than the ambient air pressure at the point of discharge.

Increased air compression may be obtained by either increasing the diameter of the compressor blades (which is typically not an alternative in thin-winged high speed supersonic aircraft) or by increasing the rotational speed of the compressor to rates as high as 12,000 to 30,000 rpm. Increasing compressor speed to these amounts results in a large turbine power requirement as well as a problem in finding an efficient method of actually transmitting that power both from the power source to the turbine and from the turbine to the compressor. For such high rotation speeds, hydraulic motors are inherently too slow, direct mechanical drive systems from the engine wear out too quickly, and electric motors require power-generating system components too heavy to be competitive with other power sources.

Currently, the power required to drive high speed laminar flow control air suction compressors is obtained from compressor bleed air of one or more thrust-producing engines of the aircraft, which ultimately causes a specific fuel consumption penalty. As will be appreciated by those skilled in the aircraft art, a study of the tradeoff between increased compressor power requirements and reduced suction air momentum drag produced by such suction systems results in the conclusion that beyond a certain limit, the drag reduction benefits are outweighed by the fuel penalties associated with increased compressor bleed air power requirements.

Using engine compressor bleed air has a number of other undesirable side effects, including mandatory precooling of bleed air on commercial aircraft for fire safety, and reduction and regulation of the bleed air pressure due to varying engine compressor pressures at different flight conditions.

A second disadvantage of prior art laminar flow control suction systems of supersonic aircraft exists because highly compressed air usually has a correspondingly high temperature. This necessitates that discharge components be formed of high temperature materials, that discharge component surfaces near fuel be thermally insulated for safety reasons, and occasionally that special cooling systems (e.g., fuel heat sink systems) be provided. The situation is worsened because of the extra weight from these necessities and their associated fuel capacity volume loss (since fuel is normally housed in the wing areas of the aircraft within which the suction system itself is located).

The present invention seeks to reduce the foregoing disadvantages and to produce a supersonic laminar flow control suction system that requires no engine compressor bleed air during high speed supersonic flight when high temperatures are most critical and fuel penalties are highest. The present invention also seeks to provide cooler discharge temperatures in order to reduce the amount of high temperature materials, insulation, and special cooling systems, plus to provide an overall smaller and lighter weight suction system.

SUMMARY OF THE INVENTION

In the preferred embodiment, a supersonic laminar flow control suction system including one or more suction surfaces each having a plurality of perforations through which suction air is drawn; one or more compressor units each comprising a turbine-driven compressor for drawing suction air through the perforations and compressing the drawn air; internal ducts connecting the suction surface to the compressor unit; and passages connecting the compressor unit exhaust to one or more discharge nozzles, is provided.

In accordance with further aspects of the preferred embodiment, the supersonic laminar flow control suction system includes a ram engine inlet duct stemming from an opening in an upper wall of a subsonic diffuser of an engine inlet. The inlet connects to a power input line that feeds one or more compressor unit turbines. The inlet air duct is angled off the engine inlet in the direction of subsonic airflow by approximately 30 degrees from horizontal. An inlet control valve controls the supply of inlet air from the inlet air duct to the input power line. A check valve prevents backflow of air toward the engine inlet. An engine compressor bleed air duct is also provided and stems off the engine compressor.

In accordance with other aspects of the preferred embodiment, the suction system further includes a short compressor output duct and a short turbine output duct. These two ducts join to form a single exhaust passage. The combination of compressor output air and turbine output air ensures a moderate overall suction air exhaust gas temperature.

In accordance with still further aspects of the preferred embodiment, a method of powering laminar flow control suction system compressor unit turbines is provided, including drawing subsonic ram engine inlet air from one or more engines and channeling the inlet air to the turbines. At or above a minimum velocity and minimum altitude, ram engine inlet air is used solely to supply power to the turbine. Below these minimums, the inlet air is supplemented with engine compressor bleed air to drive the turbines.

In accordance with still other aspects of the preferred embodiment, the method includes combining the compressor exhaust air with the turbine exhaust air to create a total exhaust air having a moderate temperature.

From the foregoing description, it will be appreciated that a supersonic laminar flow control suction system formed in accordance with the present invention provides a distinctly more efficient system and method for driving compressor unit turbines. More specifically, using engine inlet air at or above the minimum Mach and minimum altitude provides an efficient means of powering the turbines, reduces the amount of high temperature bleed air used in all operating instances, and offers an efficient means of lowering the exhaust suction air temperature. Incorporating inlet air also results in a reduction in the associated weight and volume requirements of the overall laminar flow control suction system. Using engine inlet air below the minimum Mach and altitude at least reduces the amount of engine bleed air required and continues to lower the temperature of the exhaust air.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE EMBODIMENT

As will be better understood from the following description, the invention is directed to improving the laminar flow control suction systems of supersonic aircraft. In particular, the present invention is directed to those systems actually requiring suction (as opposed to supersonic laminar flow non-suction control systems addressing the high pressure leading edge condition). In addition, although the detailed description is presented with reference to wing laminar flow control systems, it is to be understood that other boundary layer flow control systems may also benefit from use of the present invention, e.g., tail surface and engine nacelle laminar flow control systems. Indeed, the present invention is applicable to any suction system requiring an additional power source during high speed flight.

In essence, the present invention involves using ram engine inlet air solely to supply power to a compressor turbine above a certain minimum velocity, $M_{min}$, and minimum altitude, $A_{min}$. At these minimum values, using inlet air provides an acceptable ratio of total air pressure to static ambient air pressure. Below either $M_{min}$ or $A_{min}$, the pressure ratio is not acceptable and the invention must use engine inlet ram air in conjunction with engine compressor bleed air (or, generically, any suitable air pressure power source) in order to drive the turbines. At all times, the compressor and turbine of the present invention share a common exhaust to ensure moderate exhaust gas temperatures (e.g., 300° F.). The entire suction system may be controlled by a central control system.

Figure 1:
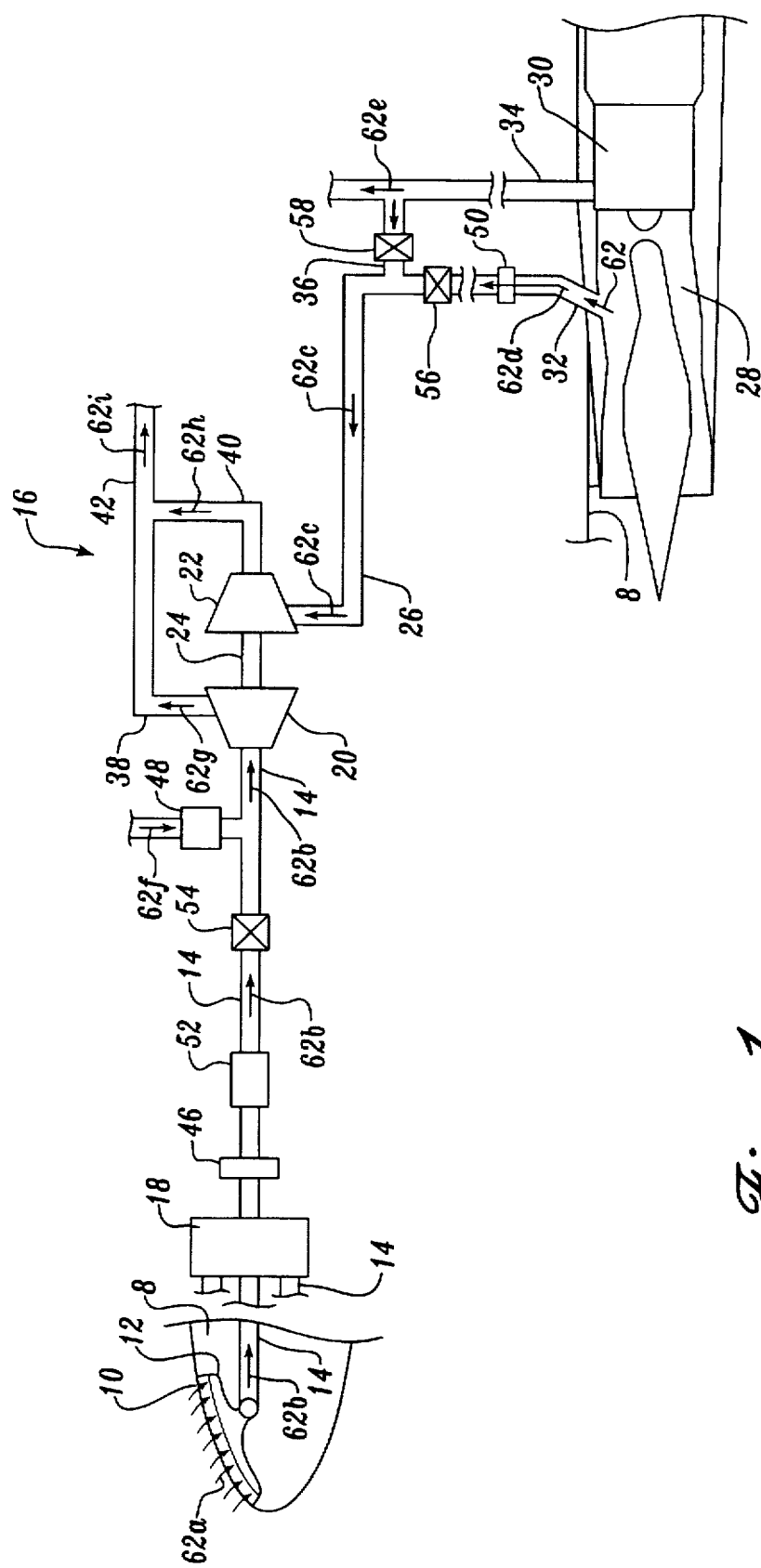
FIG. 1 is a schematic side elevation of a supersonic aircraft laminar flow control suction system in accordance with the present invention.
Figure 2:
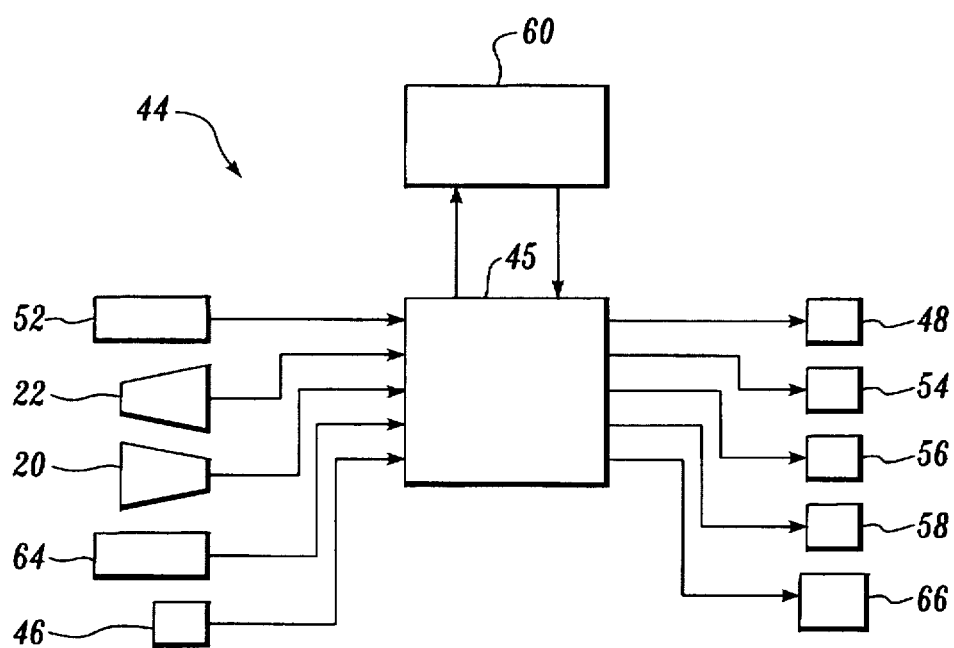
FIG. 2 is a diagram of a control system for a laminar flow control suction system in accordance with the present invention.
Figure 3:
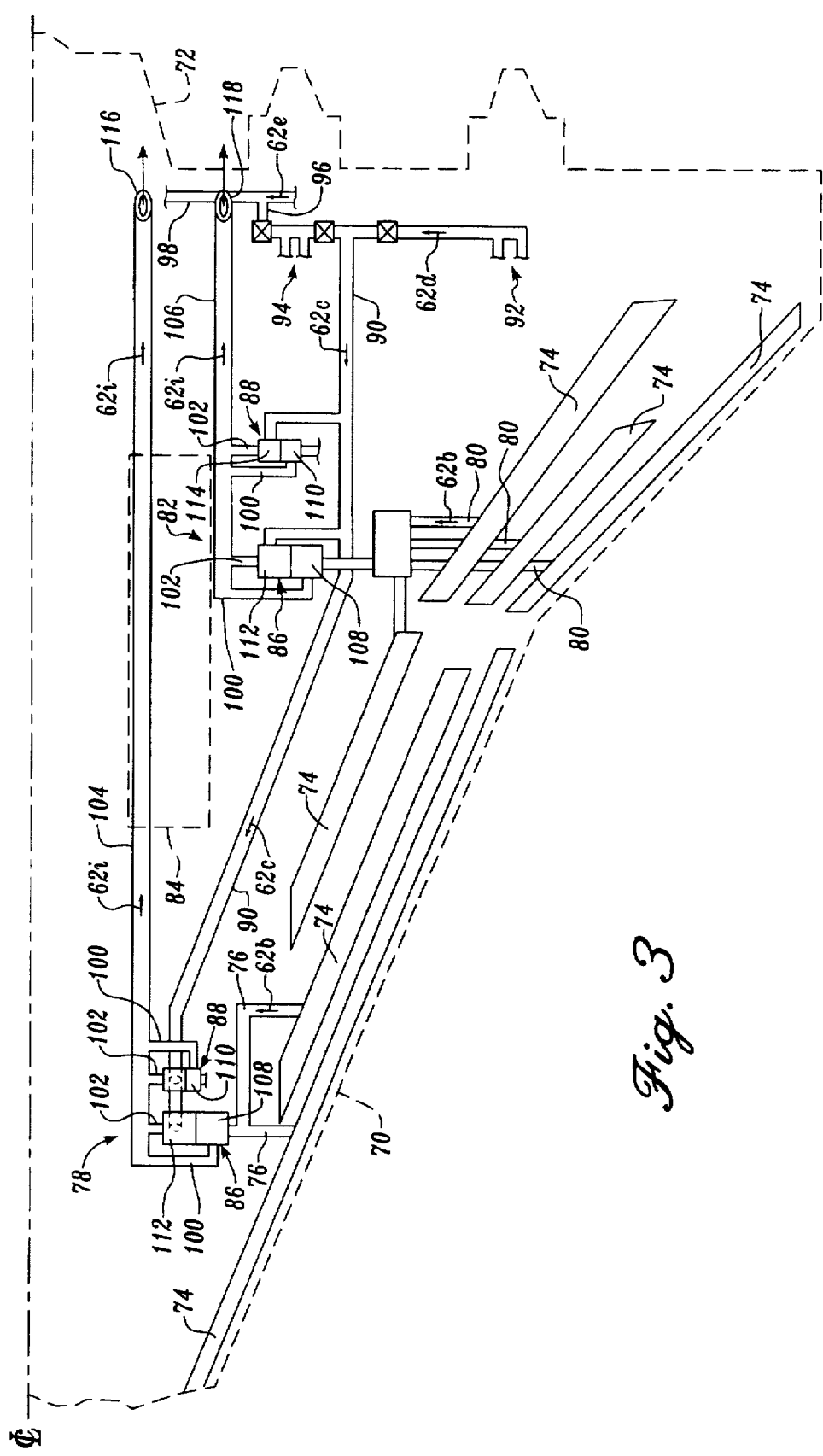
FIG. 3 is a schematic view of an exemplary embodiment of a supersonic aircraft laminar flow control suction system in accordance with the present invention.

The invention is presented below first with regard to the basic system as shown in FIGS. 1 and 2, including a description of the components and their function and operation, and second, with respect to an exemplary embodiment, as shown in FIG. 3. The embodiment of FIG. 3 demonstrates one application of the present invention to a supersonic aircraft having a swept wing and a mixed compression engine inlet. The discussion of the FIG. 3 aircraft includes specific component information, such as size, location, limitations, etc. These parameters will vary widely according to a particular application and should therefore be viewed as exemplary and not limiting.

FIG. 1 is a schematic representation of a supersonic aircraft laminar flow control suction system formed in accordance with the present invention. Multiple suction surfaces draw in external air 62a and are located in the outer surfaces of a wing 8. These suction surfaces may be located in the upper and/or lower wing surfaces, depending on the desired flight characteristics. FIG. 1 shows an upper leading edge suction surface 10 that starts at a point just above the leading edge of the wing and extends aftward a short distance. The external face of each suction surface is generally smooth except for a plurality of perforations bored therethrough. The perforation size, number, and angular orientation are according to known considerations.

A plenum 12 opens within the wing, adjacent to each suction surface. A series of internal ducts 14 connect the plenums to one or more compressor units 16. Specifications of the compressor units should be such that the overall available suction is sufficiently strong to preclude any local backflow disturbance at the suction surfaces. Only one unit is shown in FIG. 1, though more are preferred in actual use. The ducting 14 is conventional and may include known components designed to enhance the flow of suction air 62b (e.g., a manifold 18, circular piping, etc.) Each compressor unit 16 includes a turbine 22 driving a highspeed compressor 20, preferably by a common coaxial drive shaft 24 to avoid coupling difficulties. The preferred shaft 24 is supported within the compressor 20 and turbine 22 by air bearings. A master control valve 54 in the internal ducts 14 controls the supply of suction air 62b to the inlet side of the compressor 20. Preferably, a mass flow rate sensor 52 is provided in the duct 14 in order to measure the amount and rate of external air 62a being drawn in as suction air 62b.

A power input line 26 is connected to the turbine 22 and provides the power to drive the turbine during laminar flow control. The input line 26 receives pressurized air 62c from one or both of two sources: a ram engine inlet 28, or an engine compressor 30, depending on flight conditions. During flight at less than M, or $A_{min}$, both inlet air 62d and bleed air 62e are used to power the turbine 22. During flight at or greater than $M_{min}$ and $A_{min}$, inlet air 62d alone is sufficient to power the turbine 22. These numbers are derived from basic parameters known to those skilled in the art, and will vary from one design to another depending on a number of factors, including desired pressure ratio, suction flow rate, suction surface area, and efficiency and type of engine inlet.

Still referring to FIG. 1, an inlet air duct 32 stems from an opening in an upper wall of an engine subsonic inlet region, to the power input line 26. The preferred inlet air duct 32 is angled off the inlet in the direction of subsonic airflow by approximately 30 degrees from horizontal. This orientation permits subsonic air to be siphoned from the inlet 28 without significantly disturbing the inlet subsonic flow. An inlet control valve 56 controls the supply of inlet air 62d from the inlet air duct 32 to the turbine input line 26. A check valve 50 prevents backflow of air toward the engine inlet. An engine compressor bleed air duct 34 stems off the engine compressor 30. A number of commercial aircraft already include such a bleed air duct to power environmental systems. Therefore, as shown in FIG. 1, only a short bridge duct 36 is required to direct a portion of the bleed air 62e into the turbine power input line 26. A bleed air control valve 58 controls the supply of bleed air 62e from the bleed air duct 34 to the turbine input line 26.

Suction air 62b drawn into the compressor unit 16 through the master control valve 54 is compressed and exhausted from the compressor via a short compressor output duct 38. Likewise, turbine air is exhausted through a short turbine output duct 40. Both output ducts 38, 40 join to form a single exhaust passage 42 that connects to a discharge nozzle (or other suitable discharge component). The discharge nozzle is usually placed at the trailing edge of the wing, facing aft, although other locations may be used.

The laminar flow control suction system of the present invention further includes a central control system 44, illustrated in FIG. 2, having a central processing unit 45. Various components may be used in this system, depending on the level of sophistication required in a particular application. In the illustrated embodiment, such components include a flame arrester 46, a surge control unit 48, the mass flow rate sensor 52, the master control valve 54, the inlet air control valve 56, the bleed air control valve 58, and other aircraft performance data sources 64 (e.g., for performance data, flight conditions, etc.).

The flame arrester 46 is useful for preventing the spread of fire from the compressor unit 16 to wing fuel tanks. Typical locations of flame arresters are upstream of the compressor unit. The surge control unit 48 provides input air 62f whenever the suction air intake is at an extremely low pressure in order to avoid damaging the compressor unit by overspeed. Input air 62f may be provided from an auxiliary air scoop (not shown). The mass flow rate sensor 52 in conjunction with the control valves, provide system information on the current status of such components to the central processing unit 45. The control system preferably includes a display unit 60, either as a stand alone panel or as part of a larger cockpit display. The unit 60 preferably includes the ability to accept pilot inputs in addition to the display of suction system data. Many other sensors and control components are available for inclusion in the suction system of the present invention, their appropriate use being well known to those skilled in the art.

In operation, the control system 44 is activated and accepts inputs from the various components of the laminar flow control suction system. Typical pieces of information include the control valve positions, the mass flow rate, the compressor and turbine rotational speeds, aircraft speed, aircraft altitude, air pressures, etc. According to its predefined logic, the control system 44 computes the optimal configuration and outputs control commands to affect the suction system accordingly. The control system 44 may also output system information to other unrelated systems 66 (e.g., a flight management computer).

For example, in transitioning above $M_{min}/A_{min}$, the control system 44 may track aircraft speed and altitude, compressor input pressure, and exhaust passage pressure to determine whether it is appropriate to shut off the bleed air duct. If so, the control system will then command the bleed air control valve 58 to shut off.

Once the control system sets the laminar flow control suction system to an optimal operating configuration, power is provided to the turbine 22 to rotate the coaxial shaft 24 in order to cause a like rotation of the compressor blades. Rotation of the compressor blades provides the suction action that draws air through the suction surface holes, into the internal ducts 14, and to the compressor 20.

At the compressor 20, suction air is compressed to a pressure significantly higher than the pressure of the suction air prior to being compressed, which causes the suction air to become very hot. Compressor exhaust air 62g temperatures are known to be locally as high as 700° F., such as during M2.4 flight. These high temperatures require the use of insulation if there are any closely adjacent fuel-carrying structures or lines. The turbine exhaust air 62h temperature is comparatively much lower (e.g., 100° F. at M2.4). The combined exhaust air 62i output of the compressor 20 and turbine 22 is a moderate temperature (e.g., 300° F. at M2.4), but is still pressurized enough to flow through the exhaust passages 42 to the discharge nozzle and out into the free stream airflow.

As is readily understood by those skilled in the art of aircraft flow control systems, location and capacity of the suction surfaces, perforations, compressor unit, internal ducting, exhaust passages, and discharge nozzle are highly dependent upon a particular airplane application. Rarely are two systems alike in other than their basic function. The particulars of these elements for various applications is not set forth here because the novelty of the present invention lies not in the conventional elements of the system—the compressor unit 20, perforations, ducting 14, etc.—but rather in the inclusion of ram engine inlet subsonic air to power the turbine 22 and in the use of the turbine exhaust air 62h air to cool the compressor exhaust.

FIG. 3 is a plan view of an exemplary embodiment of a supersonic laminar flow control suction system in accordance with the present invention. The outline of a supersonic wing 70 and portions of a fuselage 72 are shown in phantom. This embodiment includes both upper suction surfaces 74 and lower suction surfaces (not shown), as would be appropriate for dual-surface boundary layer flow control aircraft. Suction surfaces 74 are shown as narrow strips. In other applications, these surfaces may instead be large panels covering a significant percentage proportion of the total wing surface area. The suction surfaces in this embodiment are comprised of thin titanium strips having more than a million nearly microscopic laser-drilled perforations therethrough.

Multiple forward ducts 76 connect the forward-most suction surfaces to a set of forward compressor units 78 located near the fuselage 72. Likewise, multiple aft ducts 80 connect the aft-most suction surfaces to a set of aft compressor units 82 located outboard of the main gear bay 84, ahead of the wing box (not shown). For other applications, the ducts and units may be located in other areas of the wing in a manner that maximizes use of space for that particular aircraft. The placement of these items is not particularly important to the present invention.

Each set of compressor units includes both an upper surface compressor unit 86 for providing suction action to the upper wing suction surfaces, and a lower surface compressor unit 88 for providing suction action to the lower wing suction surfaces. Therefore, the embodiment of FIG. 3 has four total compressor units. For this configuration, the compressors are preferably capable of 12,000 to 18,000 rpm for 200 and 100 hp upper and lower units, respectively. The compressors are multistage axial flow compressors, and the turbines are three stage radial flow turbines. The engine inlets are of a diffusing type, coverting supersonic flow to subsonic flow at efficiencies ranging, preferably, from 85% to 93%.

A single power input line 90 inputs pressurized air 62c to power all turbines during boundary layer control. The single power input line 90 is fed by a first double tap 92 located on an outboard engine inlet and a second double tap located on an inboard engine inlet. The tap connections are angled in the direction of subsonic inlet flow approximately 30 degrees. Typical airspeeds in the inlet range from M0.3 to M0.5 at the inlet taps. Also connected to the single power input line 90 is a bridge duct 96 from an environmental control system engine bleed air line 98. All components and structures near the fuel-carrying wing box are double walled and insulated for safety.

Still referring to FIG. 3, the compressors 108, 110 of each compressor unit 86, 88 exhausts pressurized air through a short compressor output duct 100, while each turbine 112, 114 exhausts air through a short turbine output duct 102. The output ducts of the forward and aft compressor unit sets join to form a single exhaust passage 104, 106, respectively, that connects to a discharge nozzle 116, 118. Because the suction system exhaust temperatures are lower for the present invention, less insulation and cooling are required around the exhaust passages 104, 106. This advantageously reduces the suction system weight and volume requirements.

As in the above system description, a central control system regulates the entire suction system. For the exemplary embodiment of FIG. 3, $M_{min}$=Mach 1.8 and $A_{min}$=55,000 ft. During flight at less than Mach 1.8 or 55,000 ft, the control system configures the system to use inlet air 62d and bleed air 62e to power the turbines. During flight at or greater than Mach 1.8 and 55,000 ft, inlet air alone is sufficient to power all turbines. Because the control system is continuously monitoring the suction system, once these general flight conditions are met, the control system will stop the flow of engine bleed air to the input line 90. Reducing the use of engine bleed air slows fuel consumption without a momentum drag increase, and reduces the need to cool high temperature air. During all instances of operation, the exhaust compressor suction air is combined with amounts of low temperature engine inlet air and exhausted out the discharge nozzle into the free stream airflow.

As will be appreciated, the above exemplary embodiment is applicable for supersonic aircraft having diffusing type engine inlets, e.g., the F-16, the French-British Concord, and the Russian TU 144.

While preferred embodiments of the invention have been illustrated and described, it will be appreciated that various changes can be made therein without departing from the spirit and scope of the invention. Examples of such changes include the size, number, and location of compressor units on the aircraft; the angle of the air inlet taps; the overall suction capacity of the air suction system; the components of the control system; and the exhaust arrangement. Hence, within the scope of the appended claims, it is to be understood that the invention can be practiced otherwise than as specifically described herein.

The embodiments of the invention in which an exclusive property or privilege is claimed are defined as follows:

1. In a boundary layer flow control suction system for an aircraft including a supersonic engine inlet having a region of subsonic airflow, a source of engine bleed air, and a boundary layer suction compressor unit having a turbine driving a compressor, the compressor being connected to a suction surface of the aircraft for suctioning external air from an aircraft surface;
    the improvement comprising a turbine input line connected to both the region of subsonic airflow and the source of engine bleed air during flight at less than a predetermined minimum aircraft speed $M_{min}$ and minimum aircraft altitude $A_{min}$, and connected only to the region of subsonic airflow during flight at at least the $M_{min}$ and $A_{min}$;
    whereby the turbine is powered from air flowing through the turbine input line during boundary layer flow control.

2. The improvement according to claim 1, wherein the suction system is a laminar flow control suction system for a supersonic aircraft.

3. The improvement according to claim 1, wherein the subsonic region is a subsonic diffuser and the airflow is diverted from the subsonic region at a location along an upper surface of the subsonic diffuser.

4. The improvement according to claim 1, wherein the subsonic region includes sidewall surfaces and the inlet airflow is diverted from the sidewall surfaces at an angle of approximately 30 degrees.

5. The improvement according to claim 1, wherein the suction system includes an exhaust passage connecting to an output of the compressor, the exhaust passage for exhausting pressurized suction air, the improvement further comprising a turbine output duct connecting the turbine to the exhaust passage.

6. A laminar flow control system for a supersonic aircraft comprising:
    (a) a suction region located on an aerodynamic surface of the aircraft, the suction region including a plurality of perforations through which suction air is drawn into the aircraft;
    (b) a supersonic engine inlet including a region of subsonic airflow;
    (c) a source of engine bleed air; and
    (d) a compressor unit for drawing in the suction air from the suction region, the compressor unit including a turbine driving a compressor; the turbine being connected to and powered by air from both the subsonic airflow region and the engine bleed air during flight at less than a predetermined minimum aircraft speed $M_{min}$ and minimum aircraft altitude $A_{min}$; and being connected and powered by air from only the region of subsonic airflow during flight at and above the $M_{min}$ and $A_{min}$.

7. The laminar flow control system according to claim 6, wherein the suction system is a laminar flow control suction system for a supersonic aircraft; the subsonic region is a subsonic diffuser; and the airflow is diverted from the subsonic region at a location along an upper surface of the subsonic diffuser.

8. The laminar flow control system according to claim 7, wherein the subsonic region includes sidewall surfaces and the inlet airflow is diverted from the sidewall surfaces at an angle of approximately 30 degrees.

9. In a method of boundary layer flow control suction for an aerospace vehicle including a supersonic engine inlet having a region of subsonic airflow and including a source of engine bleed air, the method including suctioning air from an aerodynamic surface of the aerospace vehicle using a compressor driven by a turbine, the compressor being connected to the aerodynamic surface;

the improvement comprising powering the turbine using pressurized air from both the subsonic airflow region and the engine bleed air source during flight at less than a predetermined minimum aerospace vehicle speed $M_{min}$ and minimum aerospace vehicle altitude $A_{min}$, and powering the turbine using only pressurized air from the subsonic airflow region during flight at at least the $M_{min}$ and $A_{min}$.

10. The improvement according to claim 9, wherein the compressor and the turbine produce exhaust air, the improvement further comprising combining the compressor and turbine exhaust airs and emitting the combination from the aerospace vehicle.

11. The improvement according to claim 9, wherein the subsonic airflow region is located along an upper surface of the engine inlet.

12. The improvement according to claim 9, wherein the subsonic region includes sidewall surfaces and the pressurized air is diverted from the sidewall surfaces at an angle of approximately 30 degrees.

13. A method of using a suctioning system for suctioning air from an aerodynamic surface of a supersonic aircraft comprising:

(a) providing a suction surface on the aerodynamic surface;

(b) providing a supersonic engine inlet having a region of subsonic airflow, providing a source of engine bleed air, connecting a compressor to the suction surface, and driving the compressor with a turbine;

(c) drawing air from the suction surface with the compressor by powering the turbine using pressurized air from both the subsonic airflow region and the engine bleed air source during flight at less than a predetermined minimum aircraft speed $M_{min}$ and minimum aircraft altitude $A_{min}$, and powering the turbine using only pressurized air from the subsonic airflow region during flight at at least the $M_{min}$ and $A_{min}$.

14. The method of suctioning air according to claim 13, wherein the compressor and the turbine produce exhaust air, the improvement further comprising cooling the turbine exhaust air by combining the compressor and turbine exhaust airs and emitting the combination from the aircraft.

15. The method of suctioning air according to claim 13, wherein the suctioning system is a laminar flow control suction system for a supersonic aircraft; the subsonic region is a subsonic diffuser; and the pressurized air is diverted from the subsonic region at a location along an upper surface of the subsonic diffuser.

16. The method of suctioning air according to claim 13, wherein the subsonic region includes sidewall surfaces and the pressurized air is diverted from the sidewall surfaces at an angle of approximately 30 degrees.

* * * * *